United States Patent Office 3,436,224
Patented Apr. 1, 1969

3,436,224
PREPARATION OF AN ALCOHOLIC DRY BEVERAGE POWDER
Harold E. Bode, Rm. 308, Schofield Bldg., Cleveland, Ohio 44115
No Drawing. Filed Aug. 10, 1964, Ser. No. 388,695
Int. Cl. C12g 3/00
U.S. Cl. 99—31                             5 Claims

ABSTRACT OF THE DISCLOSURE

An alcoholic dry beverage powder is prepared by dehydrating a vapor-sorbable, particulated, starch based polysaccharide material to a moisture content of less than 0.75%, cooling the dehydrated material in an anhydrous medium, and exposing the dehydrated material to anhydrous ethanol, and one or more anhydrous food beverage flavors from the group comprising carbon dioxide and aroma volatiles from cereals, fruits, or vegetables.

---

This invention relates to novel food products and means for producing the same.

One of the objects of this invention is to produce anhydrous, moisture free, carbohydrates suitable for the absorption or adsorption of food flavoring materials.

Another object of the invention is to devise novel means for enabling the adsorption of substantial amounts of food flavors into edible carbohydrates.

Another object of the invention is to produce, new, entirely different, and novel food flavoring effects by exploiting the unique adsorption properties of certain anhydrous carbohydrates.

My invention relates more particularly to anhydrous starches or modified starches. However, the principles of this invention, could also be usefully exploited with other carbohydrates such as pectins, cellulose, pentosans, gums, or various other polysaccharide materials containing three or more monosaccharide units in their polymer. Polysaccharide gums wherein hexose, pentose and uronic acid units are linked with one another, can be used as the sorbents. Examples are locust bean, agar, or karaya.

It has been discovered that, when carbohydrates, such as starch or modified starches, are subjected to heat or other treatments which causes the dehydration or substantially complete removal of physical or chemically combined water, the resulting anhydrous starches have a unique capability of adsorbing as well as absorbing substantial amounts of edible anhydrous vapor or gaseous materials. Many delicate food flavors are volatile materials which, when transformed into a dry vapor state, are capable of being adsorbed by the said anhydrous starch. It has also been found that, such anhydrous starches are capable of adsorbing substantial amounts of carbon dioxide. The latter is a gaseous food flavor which, when adsorbed into anhydrous starch, results in a starch-$CO_2$ blend that is capable of introducing new types of flavoring effects in a variety of food products.

It has furthermore been found that, when anhydrous starches that have had sorbed therein carbon dioxide, are exposed to other gaseous or anhydrous food flavoring materials, interesting and valuable blends of starch, carbon dioxide, and food flavors are obtained.

Although the exposure of anhydrous starch to carbon dioxide, results in a starch product wherein the carbon dioxide exists both in a chemical as well as a colloidal or physical combination with starch, this general type of carbon dioxide treated anhydrous starch will henceforth be referred to in this specification as carbonated starch.

Many food flavor vapors are of a delicate, chemically unstable nature. In the past, it has been very difficult, if not impossible, to capture or fix such food flavors within a solid food product whose origin is not that of the original food flavor. In accordance with my invention, it has been discovered that delicate food flavors which exist in vegetables such as peppers, garlic, or onions; or in fruits such as melons, watermelons, pears, bananas, berries, grapes, cherries, apples, nuts, and citrus fruits; or in grains such as barley, rye, or oats; can, under proper conditions, be sorbed into certain kinds of anhydrous modified starches under conditions wherein the resulting blend of anhydrous starch and food flavor vapors remains a free flowing pulverant food material that can be blended with other foods.

Furthermore, it has been discovered that, in most cases, the above type of delicate food flavors, when sorbed into anhydrous modified starches, become either chemically or colloidally fixed onto the starch in a manner where they are much less likely to be volatilized or lost than when the same volatile food flavors existed in their original fruit or vegetable environment. The above new types of blends of anhydrous carbohydrate with food flavor vapors or carbon dioxide enable the creation of entirely new food tasting and flavoring effects. Thus, as will be more specifically outlined in this specification, new types of bakery products, desserts, cheese products, beverages, and confections can be created.

The moisture content of polysaccharide carbohydrates, particularly amyloidal products such as starch, cereals, or grains, is not simply a matter of the presence of a certain amount of free water with a carbohydrate. Many complex physical, colloidal and chemical phenomenon are involved; particularly in the case of the nature of the water-distribution in commercial starches, modified starches, or dextrins. Some of the water in the said moisture exists in a sorbed form, and could represent either a state of adsorption or absorption. The moisture water present in a commercial starch product in an adsorbed form represents a phenomenon or condition wherein the water, in an extremely thin layer, or molecular layer condition, adheres to the surfaces of individual starch particles.

In some cases the above adsorption results in the creation of a starch adsorption compound which is a stable combination of varying chemical compositions, formed between the starch adsorbing surface and the water. This is sometimes referred to as chemically bound water.

The moisture in starch also includes absorbed water by which is meant water which has been soaked up or imbibed to occupy the space between individual starch granules in a comminuted starch or the interstices of the grain. The action is similar to that which takes place when a sponge absorbs water. Still another form of water which represents a part of the moisture content of starches, modified starches, or dextrins, is chemically bound water created by the formation of hydrates of some of the complex polysaccharides in the amyloidal material.

It has been found, in accordance with this invention, that a large variety of food flavors can be fixed by, and incorporated or occluded in a substantially stable form into anhydrous or substantially anhydrous amyloidal materials, particularly starches and dextrins.

No concise explanations of just how food flavor vapors are taken up in substantial amounts by dry starch are available. However, it is generally believed that food flavor vapors are retained by dry starch products by means of a combination of adsorption, absorption, and chemical fixation forces; the particular distribution of these forces depending upon the particular kind of modified starch product being used, as well as the physical and chemical nature of the food flavor which is being incorporated into the dry carbohydrate material.

The complete dehydration, or the dehydration to a point where only trace amounts of moisture are present, creates starches, modified starches, dextrins or cerial meals, wherein anhydrous ethanol or other moisture-free flavor vapors are capable of existing in a much more stable, or less volatile form, with the starch product. The exact technical reasons are not completely understood, but it is believed that when a flavoring agent such as ethanol, is sorbed into anhydrous starch, the removed hydrate water which was present in a chemically attached form to some of the dextrose polymers making up the starch molecule, is replaced by another hydrate, namely an alcoholate. In other words, if one uses the generic formula R–OH to represent any hydroxyl compound, then, in the case of the anhydrous ethanol, its hydroxyl group functions in a manner similar to that of hydrogen hydroxide, namely water. In other words, some kind of definite or loose chemical attachment takes place between the ethanol and the anhydrous starch molecule polymer particles to form a stable combination of ethanol and the carbohydrate. It has been found that the substantial formation of alcoholate combinations with anhydrous ethanol will not take place unless the carbohydrate contains less than about 0.5% moisture. By creating conditions for maximum alcoholate formation, in conjunction with anhydrous ethanol sorption, a dry carbohydrate food product is obtained wherein a readily volatile food flavor vapor such as ethanol is transformed into a stable fixed state within a solid medium.

In addition to the inhibition of alcohol volatility, the creation of dextrose polymer alcoholates within the starch molecule also serves to provide a food preservative medium for other food flavor vapors which can be sorbed into the anhydrous starch material. The presence of alcoholate addition compounds acts to inhibit or prevent food flavor spoilage.

The addition of anhydrous carbon dioxide to an anhydrous amyloidal material also creates conditions wherein the $CO_2$ acts not only as a food flavor but also acts as a food preservative and stabilizer against decomposition by oxidation or other forms of chemical deterioration.

In this specification, the term "moisture" is intended to include any kind of water present in the carbohydrate, regardless of whether this water exists in a chemically bound form, or in a sorbed form.

In practicing my invention it is not mandatory to use a bone-dry or completely moisture-free amyloidal product. In general, the closer the dry carbohydrate, particularly modified starches or dextrins, attain a moisture content of less than 0.5%, the more efficient will be the incorporation of the food flavor vapor and the more stable will be the resulting blend of substantially anhydrous starch product and food flavor.

In this specification the term "substantially anhydrous" is defined as less than 0.5 percent moisture for the carbohydrate, and less than 0.1 percent moisture for the flavor vapor or vapor mixture.

In some cases, depending upon the nature of the food flavor, or food flavor vapor mixture, as well as the intended use of the resulting blend of starch product and flavors, dried starch products containing as much as 1.0 or 1.25% moisture can produce valuable blends of food flavor vapors with the substantially dried carbohydrate. Beyond a moisture content of about 1.5% the efficiency of the food flavor vapor sorption rapidly diminishes. Below a carbohydrate moisture content of about 0.75% tangible improvements in the efficiency of food flavor vapor incorporation occur, as the moisture content further decreases. From the standpoint of taste as well as odor stability, many food flavor vapors will benefit by the presence of a minimum of moisture in the sorbed carbohydrates such as starches, modified starches, dextrins, algins, agars, or pectins.

The degree of volatilization or escape of the sorbed flavor vapor will vary with the temperature of the sorbed blended carbohydrate materials, as well as the physical or chemical nature of the food flavor vapor which is being sorbed. It has been found, that under certain conditions, and with certain food vapors, it is possible to maintain a substantial amount of food flavor within the carbohydrate material, even though the blended material is exposed to conditions where the food flavor vapor would ordinarily be readily removed by heat volatilization or by vacuum.

The particular means for dehydrating the carbohydrate prior to the sorb exposure to flavor vapors, will depend on the degree of dryness desired in the sorbing carbohydrate. Thus, for starches or modified starches of about 1% moisture content, the commercial starch can be dehydrated in the usual type of dextrin cooker used for commercial dextrin production. Where moistures of less than 1% are desired, such dehydrating means as flash dryers, vacuum drying equipment, freeze-drying, or infrared radiation drying can be used.

After the carbohydrate has been dried to the desired low moisture or anhydrous state, proper means should be taken to assure the absence of any kind of water vapor or other moisture which would be readily readsorbed by the starch, thereby preventing the efficient action of the dry starch as a sorbing agent.

It is preferable to provide conditions wherein the low moisture or anhydrous carbohydrate product is brought into contact with the desired food flavor vapor under preferably room temperature anhydrous conditions. Lower flavor vapor sorbing temperature conditions can be used, but temperatures higher than room temperature will cause a decrease in the amount of flavor vapor material which can be adsorbed by the carbohydrate. By resorting to pressurizing food flavor vapors, large amounts of the vapors can be sorbed into the dry carbohydrate at room temperatures.

Because of the large variety and complexity of food vapors and food vapor mixtures that can be made to function in accordance with the principles of this invention, further details on the technology involved in the functioning of my invention are being presented herewith.

The moisture-free or substantially anhydrous carbohydrate, in accordance with my invention, can act as a vehicle or means for carrying out the following functions:

(a) Produce an adsorption compound consisting of a stable combination of varying chemical composition, formed between a carbohydrate adsorbing surface and an adsorbed food flavor vapor.

(b) The absorbent can be any anhydrous or substantially anhydrous carbohydrate polysaccharide containing, in most cases, less than 0.5% of moisture.

(c) The preferred dehydrated carbohydrates are starch granules, acid-modified starches, anhydrous gelatinized starch granules, dextrins produced by either acid or enzyme modification, and phosphated starches.

(d) Where maximum carbohydrate water solubility is desired, the preferred adsorbent is either anhydrous corn syrup solids or dehydrated malt syrup solids. Where partial carbohydrate solubility is desirable, a preferred carbohydrate adsorbent is anhydrous or substantially anhydrous roll gelatinized starch, such as the commercial gelatinized starch product known as Amijel, after further dehydration to less than 0.5% moisture.

(e) In cases where it is desirable or necessary to have the starch adsorbent containing sorbed food flavor vapors to also function in a gel capacity, non-gelatinized modified starches such as anhydrous regular pearl corn starch, tapioca starch, waxy maize starch, or phosphated starches can serve as the carbohydrate adsorbent.

(f) The sorbable food flavor vapors should preferably be anhydrous or contain less than 0.1% of moisture.

(g) The food flavor vapors which can be beneficially exploited by sorption into the anhydrous carbohydrate include a large variety of edible materials capable of existing in a vaporous state. Examples of suitable edible vapors are carbon dioxide, ethanol, various essential oils, and volatile flavoring extracts of fruits, vegetables and cereals.

(h) Since, for maximum efficiency, the sorbing food flavor vapors should be in as closely an anhydrous state as is practical, dehydrating means capable of attaining such substantially water-free conditions should be used. Since, in many cases, the edible sorbing flavor vapors are a complex organic material containing delicate or unstable taste, odor or other organoleptic factors, it is preferably to apply means for vapor dehydration involving a minimum of deterioration effects from heat or other sources. In many cases dehydration by freeze-drying will produce a sufficiently satisfactory anhydrous condition for the flavor vapor. In other instances, it may be necessary to further desiccate the freeze-dried food flavor by a flavor extractant such as anhydrous ethanol, followed by proper desiccation to remove any extracted water that may have accumulated in the ethanol. In some cases radiant heat using infrared rays or di-electric-heat dryers functioning by means of a high-frequency electric field are best used to produce the necessary anhydrous, undecomposed food flavor vapor. To assure substantially complete drying of the food flavor vapor before being adsorbed into the carbohydrate adsorbent, various desiccants can be used. Examples are solid adsorbent desiccants such as activated alumina or fused anhydrous calcium sulfate. Liquid absorbents may, in certain circumstances, be used to remove contaminated water vapor from food flavor vapors. Examples of such liquid absorbents are glycerol or lithium chloride solutions. When such water vapor removal means are used, proper precautions should be taken to prevent the contamination of the dry flavor vapor with liquid absorbent.

(i) Numerous edible essential oils lend themselves to advantageous sorption by anhydrous modified starch or corn syrup solids. Such oils occur in leaves, twigs, blossoms, plant roots, and fruits. When such essential oils are prepared by means of steam distillation, these oil vapors, after proper thorough dehydration, create valuable adsorption compounds capable of creating many patterns of taste and flavor. Where edible essential oils are decomposed by steam distillation, which is particularly true in the case of oils from blossoms, such edible flavor or aroma materials can be prepared for anhydrous starch product adsorption by first extracting the blossoms with purified fats, followed by anhydrous ethanol extraction to remove the essential oils. The resulting blend of ethanol and essential oils, upon vaporization and suitable dehydration precautions, can then be sorbed as a vapor mixture into such anhydrous amyloidal materials as anhydrous starch, modified starches, corn syrup solids, dextrins, or highly dehydrated amyloidal grain meals produced from grains such as wheat, oats, corn, rice, barley, or rye.

The following examples illustrate the invention:

Example 1.—Anhydrous carbonated corn starch

A 15 Bé. aqueous corn starch slurry was centrifuged and the partially dewatered wet starch cake containing about 40% moisture was vacuum dried in a Proctor & Schwarz dryer to a moisture content of about 10%. This commercially dry corn starch was then further dehydrated by transferring to a steam jacketed dextrin cooker which was enclosed in a sealed chamber. Sufficient jacket steam heat was applied to enable the agitated mass of starch in the dextrin cooker to attain a temperature of about 212° F. Means were provided for the removal of liberated water vapors, whereby the moisture content of the starch batch reached about 5%. Hot anhydrous $CO_2$ gas was introduced into the dextrin cooker. The heating was continued until the moisture content was reduced to 0.3%. The presence of a $CO_2$ atmosphere served the double purpose of minimizing the danger of spontaneous combustion as well as introducing a flavor vapor into the substantially anhydrous starch; the said flavor vapor being $CO_2$.

When a moisture content of 0.3% was reached the jacketed steam heat source was changed to a jacketed cold water circulation cooling, and cold $CO_2$ gas was introduced into dextrin cooker, whereby, with further agitation, the anhydrous starch batch attained room temperature, namely about 70° F. During this time, the anhydrous $CO_2$ was given an opportunity to be sorbed by the anhydrous starch. The sorbed, carbonated anhydrous starch was then found to contain 9.5% of $CO_2$, based upon dry starch weight.

This anhydrous carbonated starch was then placed into shipping containers which were provided with proper means for minimizing the access of air or moisture to the carbonated starch product.

When the above type of carbonated starch is applied in various food products the $CO_2$ acts as a flavoring agent or as a means for providing the kind of taste effects as that brought about by the presence of $CO_2$ in carbonated beverages.

In the presence of sugar, even small amounts of $CO_2$ assert a noticeable tangy taste effect.

The carbonated starch serves as a convenient and efficient vehicle as well as fixing agent for $CO_2$ which, prior to this invention, was present in foods in the form of either an aqueous solution or in the form of chemical combination with an alkaline material, particularly baking soda.

In my process, in accordance with this invention, anhydrous carbohydrates create a means for allowing $CO_2$ to be present in a dry, comminuted food material, without the encumbrances of chemical attachment or aqueous solution.

In place of unmodified corn starch, carbonated starch products can be produced from either acid or enzyme modified thin boiling starches, cereals, gelatinized starches, or various edible chemical derivatives of starch such as, for example, the phosphated starches.

It has been found that, if the necessary precautions are taken to assure an anhydrous starch adsorbent, that some of the sorbed $CO_2$ is so stable that it is not readily removed even under vacuum drying conditions. This phenomena, enables the production of a commercial carbonated starch which, even when exposed to the atmosphere, will still maintain substantial amounts of $CO_2$ in a strongly fixed adsorption state.

Example 2.—Anhydrous carbonated corn syrup solids

A 42 Bé. corn syrup, also known as CSU, was subjected to a vacuum spray drying dehydration to reduce the moisture content to 0.06%. The suspended dehydrated corn syrup solids were then transferred into a sealed chamber containing cold $CO_2$ gas having a temperature of about 30° F. The corn syrup solids were moved in a thin layer over a vibrating moving belt thru the said cold $CO_2$ atmosphere. The vibrating moving belt caused a partial suspension of the corn syrup solids, thereby enabling intimate contact with the surrounding cold $CO_2$ atmosphere. After the cooled $CO_2$ sorbed, corn syrup solids had taken up 8.2% of carbon dioxide, based upon dry corn syrup solids weight, the resulting carbonated corn syrup solids were packed in shipping containers similar to that which industry uses to pack regular corn syrup solids. These are shipping containers provided with necessary means for minimizing the access of moisture vapor.

Since the carbonated corn syrup solids product is water soluble, it has certain advantages in many food uses over the water insoluble carbonated starch produced per Example 1. When this type of carbonated corn syrup solids is dissolved in water, a carbonated beverage similar to selzer water is obtained. For the simulation of a flavor carbonated beverage, anhydrous volatile beverage flavors can be introduced simultaneously with the $CO_2$ during the sorption of these vapors by the anhydrous corn syrup solids. This results in a carbonated corn syrup solids product containing a beverage flavor such as strawberry, cherry, or citrus. By blending such a sorbed mixture of anhydrous corn syrup solids, flavor vapors, $CO_2$, and dry sugars, there is obtained a reconstitutable carbonated beverage powder. Such a product has many advantages over regular carbonated beverages which consist of about 85% water, about 12% of sugar; as well as other solids that account for the beverage taste.

In place of corn syrup solids, one may use malt syrup solids or anhydrous solid amyloidal material obtained by properly dehydrating high fluidity acid or enzyme converted gelatinized starches. For optimum water solubility, solution clarity, and blandness, corn syrup solids are the preferred anhydrous carbohydrate base for the materials being sorbed.

For beverages where liquor clarity is not a critical factor, and for other food products where clarity or total water solubility are not critical factors, the aforesaid less soluble anhydrous carbohydrate solids may be used.

Example 3.—CSU sorbed with $CO_2$ and ethanol

Anhydrous CSU solids produced in accordance with the spray drying procedure described in Example 2 was exposed to a vapor mixture consisting of dry $CO_2$ gas and anhydrous ethanol vapor. The exposure of this vapor blend with the CSU solids took place in a sealed vacuum chamber wherein the CSU solids were suitably agitated to enable a thorough blend with the surrounding atmosphere comprising the mixture of $CO_2$ and ethanol. A sorbed anhydrous CSU product was obtained wherein $CO_2$ and anhydrous ethanol were present in the respective amounts of 6% and 3%, based upon the weight of the CSU solids.

Any suitable mechanical means for enabling the proper exposure of anhydrous CSU solids to anhydrous $CO_2$, ethanol or $CO_2$-ethanol mixture, can be used to obtain the above kinds of vapor-sorbed carbohydrate flavoring compounds. Thus, commercial corn syrup solids such as for example, the product known in the trade as FRODEX can be further dehydrated by means of either freeze-drying procedures, infrared, drying, or exposure to suitable desiccants. The above types of $CO_2$ or dry ethanol sorbed carbohydrates can also be obtained from spray dried or flash dried malt syrup solids. The corn syrup base can be either the product obtained commercially by the acid conversion of refined starch, or various other CSU-type products such as those obtained by combined acid and amylase conversions, as well as CSU products obtained by total enzyme conversion procedures.

Example 4.—Anhydrous ethanol-sorbed gelatinized tapioca starch

An aqueous slurry of tapioca starch granules was dehydrated by means of suitable filtration to a wet starch cake having a moisture content of about 45%. The wet starch cake, in suitable comminuted form, was simultaneously gelatinized and dehydrated by being passed between two heated rotating drying rollers having a sufficient temperature to produce a dried gelatinized tapioca starch having a moisture content of about 9%. The resulting commercially dry gelatinized starch was then subjected to a flash-drying operation wherein the 9% moisture tapioca starch particles were suspended in a dry atmosphere under proper temperature conditions to cause the removal of substantially all of the remaining moisture content. The resulting substantially anhydrous tapioca starch was transferred, in a suspended state, thru an anhydrous sealed chamber possessing the necessary means for avoiding the presence of moisture vapor. After the anhydrous tapioca starch was cooled to 140° F., anhydrous ethanol vapors were brought into contact with the anhydrous tapioca starch. This resulted in a sorbed anhydrous tapioca starch product that contained 11% of ethanol, based upon the weight of the starch.

Various other dehydrating procedures could be used for removing the remaining moisture from commercial starch containing 5 to 12% moisture. Examples are drying by various means such as high vacuum, freeze-drying, infrared, or dehydration with removable desiccants.

Anhydrous gelatinized starch solids have been found to be more efficient sorbents for certain food flavor vapors than anhydrous non-gelatinized starch or corn syrup solids. For certain food uses, adsorption compounds obtained from anhydrous gelatinized starch and food flavor vapors are advantageous because, simultaneously with the presence of the sorbed food flavor vapor, there is provided a starch colloid that is capable of creating a partial gel when suspended or partially dissolved in water.

Example 5.—Anhydrous reconstitutable alcoholic beverage powder

It has been found that efficient sorbable anhydrous polysaccharides create a novel tool for producing readily reconstitutable dry beverage powders. Anhydrous modified starch products, particularly the corn syrup solids or roll gelatinized starch solids types are preferred for this type of application.

One example of a novel exploitation in this area is the production of a reconstitutable alcoholic beverage, namely beer powder. A barley malt containing 4.2% moisture was extracted with anhydrous ethanol. This produced an alcoholic extract containing some of the flavor, aroma and color principles of barley malt. A beer hop extract was obtained by extracting the ethereal oils of the hops with anhydrous ethanol. This produced an alcoholic solution of the bitter principles of beer hops which consists mostly of humulone and its transition products. The alcoholic extracts of the barley malt and hops were then mixed, and contacted with a desiccant such as activated alumina to remove any remaining moisture. The resulting anhydrous alcoholic extract was vaporized and the anhydrous vapors brought into contact with substantially anhydrous corn syrup solids. During the sorption of the vaporized alcoholic extract mixture by the substantially anhydrous corn syrup solids, anhydrous carbon dioxide was introduced. There resulted an adsorption compound consisting of corn syrup solids containing, in percent by weight of carbohydrate solids, 7% of ethanol, 4% of $CO_2$, and 3.5% of a mixture of the ethanol-extractable flavor and aroma principles of barley malt and hops.

The resulting dry reconstitutable alcoholic beverage can be used either alone or in the form of blends with other sugars or malt extract materials as a beer base. If anhydrous malt syrup solids are substituted for corn syrup solids, a dry reconstitutable beer powder is obtained which more closely approaches the taste and flavor of regular beer. Various combinations or omissions in the aforesaid beverage powder can be practiced, depending upon the particular objective which is being sought. Thus, the carbon dioxide may be omitted from the beer powder and various beer constituents, in the dry form, can be blended with the basic anhydrous beer powder. Examples of blending materials which can be used to modify or influence the finished taste or flavor of the reconstitutable beer powder are soluble proteins, polypeptides, amino acids, or dry flavoring materials such as citric acid.

Example 6.—Anhydrous reconstitutable carbonated beverage powder

In the case of non-alcoholic carbonated beverages, the food flavor sorbing carbohydrate tool of this invention can be exploited to produce beverage powders containing delicate fruit flavors blended with the amount of carbon dioxide required to produce a carbonated beverage. Thus, anhydrous corn syrup solids, upon being sorbed with a vapor mixture comprising anhydrous carbon dioxide and fruit flavor vapors, produces a dry beverage powder capable of being reconstituted with water to a carbonated beverage. To provide the necessary degree of sweetness various dry sugars or sugar mixtures can be blended with the dry flavor vapor sorbed corn syrup solids. For this purpose, mixtures of dry sucrose and dextrose are preferred, but various blends of dry sucrose, dextrose, maltose, or lactose could be used.

The fruit flavor vapors can be obained by the fractionation of the flavoring and aroma principles produced during the vacuum drying of fruits such as strawberries, cherries or raspberries. The necessary fruit flavors for subsequent vaporization, suitable for this invention, also can be obtained by first freeze-drying a fruit puree and then extracting the fruit flavor and aroma materials from the freeze-dried fruit with anhydrous ethanol. Upon subjecting the resulting alcoholic extracted fruit flavors to fractional distillation to remove the ethanol, the remaining mixture of fruit flavor materials is then vaporized under anhydrous conditions and allowed to be sorbed by corn syrup solids. In one example of the above type of procedure a product was obtained wherein the anhydrous corn syrup solids contained 12%, by weight, of the carbohydrate, of the fruit flavors.

In another example, the above fruit vapors were blended with anhydrous carbon dioxide gas prior to sorption by the corn syrup solids. There resulted a reconstitutable carbonated beverage powder consisting of corn syrup solids, 8% of carbon dioxide based upon carbohydrate weight, and 9% of a mixture of flavor and aroma principles of the puree fruit.

Example 7.—Anhydrous cold water soluble carbonated starch phosphate

A phosphated corn starch was prepared by a phosphating treatment such as that described by the Neukom U.S. Patent 2,884,412. A 10% water slurry of such a phosphated starch, which contained 0.3% of phosphate, based on starch dry substance, was spray dried thru an atomizing nozzle at 5500 p.s.i. under conditions wherein the air inlet was 340° F. and the air outlet was 230° F. This produced a commercially dry suspended phosphated starch containing 4.7% moisture.

While the above 4.7% moisture phosphated starch was still in a suspended state in the spray dryer, the suspended material was transported to a hot carbon dioxide gas atmosphere provided with a suitable desiccant for the substantially complete removal of moisture from the phosphated starch as well as from the $CO_2$ atmosphere surrounding the suspended starch. The inlet temperature of this carbon dioxide atmosphere was 300° F. and the outlet temperature was 230° F. This resulted in a suspended phosphated starch containing 0.05% moisture. This substantially anhydrous phosphated starch, containing some sorbed $CO_2$, was then transferred, while still in a suspended state, to another sealed chamber containing anhydrous carbon dioxide gas having a temperature of 40° F. The anhydrous starch, in the presence of the cold $CO_2$, was cooled to a temperature of 65° F. It was then transferred to another sealed chamber having a temperature of 65° F. and containing anhydrous carbon dioxide. After one hour's agitation to assure complete contact with anhydrous phosphated starch with the carbon dioxide, there was obtained a carbonated phosphated starch containing 8% of $CO_2$, based on starch weight.

The resulting carbonated anhydrous phosphated starch is dispersible in cold water and produces a heavy bodied smooth colloidal system. From a taste flavor standpoint it is superior to regular corn, milo starch or tapioca starch because of its blandness and better shelf life stability.

Example 8.—Anhydrous ethanol-sorbed waxy maize starch

A waxy maize starch was subjected to spray dry dehydration in a manner similar to that described in Example 7. After the anhydrous starch had been cooled with the 40° F. carbon dioxide gas to room temperature, the carbon dioxide in the waxy maize starch was removed by transferring the carbonated starch to a dextrin cooker and heating the batch to a temperature of 220° F. After the carbon dioxide removal, the sealed dextrin cooker was placed under vacuum and the starch was cooled by applying a cold water jacket instead of a steam packet to the dextrin cooker. When the temperature of the anhydrous starch reached 120° F., anhydrous ethanol vapors were brought into contact with the anhydrous waxy maize starch and the batch agitated for one hour. Upon the removal of any excess ethanol vapors, an anhydrous waxy maize starch containing 11% of a mixture of sorbed and chemically attached ethanol was obtained.

The above process can also be exploited with various food flavor vapor mixtures such as $CO_2$-ethanol, ethanol-fruit flavors, or ethanol-spice flavor vapors.

Example 9.—Food applications for flavor-sorbed anhydrous starch

Sorbed anhydrous starches of the kind described in Examples 7 and 8 create new taste and flavor effects when used in such products as frozen pies, pie fillers, dessert powders, pasteries, or confectionery. When sucrose or dextrose is blended with an anhydrous carbonated starch containing various flavors such as fruit volatiles, coffee volatiles or cocoa volatiles, beverage or dessert powder bases are obtained which produce, simultaneously, the effects of a confectionery and a carbonated beverage.

Further novel modifying effects can be obtained by using various blends of anhydrous phosphated starch, waxy maize starch, or other modified starches with anhydrous CSU solids which have had sorbed or chemically combined in them various flavor vapors. For example, in the case of frozen pies, such as apple or cherry pie, the presence of anhydrous corn syrup or malt syrup solids containing sorbed therein mixtures of carbon dioxide with fruit volatiles, will introduce new and novel taste effects.

Example 10.—Coffee flavor-sorbed anhydrous starch

A free-flowing coffee sugar product was obtained by blending sucrose with 3% of an anhydrous pearl corn starch which had been sorbed with coffee flavor vapors and a small amount of $CO_2$.

In another example dry coffee extract solids obtained from ground roasted coffee was blended with corn syrup solids containing roasted coffee flavor vapors obtained by anhydrous ethanol extraction. This produced a coffee-extract powder wherein coffee flavor and aroma vapors are present in a more concentrated form than that prevailing in ordinary coffee poducts.

Example 11.—Anhydrous cereal-flavor-sorbed flours

A low protein rye flour containing 3.5% of protein was dehydrated to a moisture content of 0.2% and then subjected to sorption by a flavor vapor mixture consisting of rye flavor and aroma extracted with anhydrous ethanol from fresh rye flour. The resulting alcoholic extract of rye flavor was then completely dehydrated by means of a suitable solid desiccant, and then vaporized. The alcoholic vapors were then sorbed into the substantially anhydrous, low protein, rye flour.

This produced a rye flour flavor baking concentrate which, when blended with various other flours, starches, sugars, or cereals, introduced a distinct rye flavor effect, which is desirable in numerous bakery products.

Example 12.—Spice flavor sorbed carbohydrates

A mixture of peppers and onions was processed into a puree, and sufficiently vacuum dehydrated to produce a spice mixture having a low enough water content to enable the production of an alcoholic extract. The resulting ethanol extract was then dehydrated with a suitable solid desiccant and volatilized. The resulting anhydrous volatile spice flavor vapors were then sorbed into anhydrous CSU solids. There resulted a dry food spice powder concentrate which could be advantageously used with such food products as frankfurters, other kinds of sausage products, and poultry stuffing.

Similar flavor concentrates of a wide variety can be made, in accordance with above procedures, by using either volatilized or solvent extracted flavoring and aroma principles of vegetables, fruits, or cereals. The particular kind of dehydration for the fruit, vegetable, or grain will depend upon the physical as well as chemical nature of the flavoring materials being sought. In many cases freeze-drying or infrared drying methods are preferred. However, the principles of this invention are applicable, regardless of what dehydation means are used to either attain the necessary anhydrous state of either the sorbing carbohydrate or the sorbed food flavors. The matter of degree of sorbability, dispersibility, or gel characteristics of the reconstituted anhydrous sorbed carbohydrate can be widely manipulated by a proper choice of the carbohydrate base. This can range from the high solubility of the corn syrup solids to the partial solubility of gelatinized starch products, and the cold water insolubility of non-gelatinized starch granules.

Example 13.—Anhydrous sorbed breakfast cereals

It has been found that comminuted meals of cereal breakfast foods offer a novel means of introducing new flavor effects to breakfast foods. In accordance with this invention, this is accomplished by blending ground meals of such finished breakfast cereals as corn flakes, rice flakes, or oatmeal, with commercial corn syrup solids such as FRODEX. This blend is then subjected to substantially complete dehydration by means such as described in Examples 7 and 8. The resulting anhydrous blend of breakfast cereal solids, corn syrup solids, and food flavor vapors such as fruit volatiles, vegetable flavor extracts and coffee or cocoa extracts, create sorbed carbohydrate foods which introduce new taste and flavor effects when deposed as a thinly coated layer on breakfast cereals such as rice krispies, puffed rice, corn flakes or wheaties.

Example 14.—Anhydrous effervescents

The principles of this invention can also be beneficially exploited in the production of effervescence to be used in conjunction with such materials as baking powders or medicinal foods. For example, by using carbonated phosphated starch of the kind described in Example 7, or by using carbonated corn syrup solids, it is possible to produce a baking powder wherein the carbon dioxide is available without the production of any kind of residual chemical.

In baking powders, as well as in medicinal food effervescence products, such as alka seltzer or bromo seltzer, it has hitherto not been possible to provide a carbon dioxide liberating means, without simultaneously resulting in a residual chemical, such as soda ash, baking soda, or a calcium salt.

By using a carbonated starch or a carbonated product obtained from anhydrous corn syrup or malt syrup solids, it becomes possible to produce products where the formation of $CO_2$ is devoid of any kind of by-product or side reaction product. In the case of medicinal effervescent foods, the fixed carbon dioxide source of my invention, namely carbonated carbohydrates, are of particular value, since it is known that, in some cases, undesirable effects are produced from the residual alkali remaining after the evolution of the carbon dioxide from the medicinal effervescent.

In medicinal effervescence where the temporary existence of a starch paste coating in the digestive system is desirable, and wherein residual soda ash or baking soda are undesirable, a preferred product would be the cold water soluble carbonated phosphated starch described in Example 7. This has the desirable effects when used either alone, or in conjunction with carbonated corn syrup solids. Where no intestinal paste coating is desired, and where the objective is a rapid creation of $CO_2$ simultaneously with a rapid digestive removal of the carbohydrate base, the preferred medicinal food effervescent would be one which contains carbonated corn syrup solids.

Example 15

Anhydrous corn syrup solids were sorbed with dry vapors produced by atomizing an anhydrous ethanol solution of ginger extract. This was then dry blended with anhydrous carbonated corn syrup solids, citric acid and sucrose. Upon reconstituting with water, a carbonated beverage similar to ginger ale was obtained.

Example 16

During the spray drying of citrus pectin, an anhydrous carbonated pectin was obtained by procedures similar to those described in Example 7. A separate batch of anhydrous pectin was then exposed to sorption by dry fruit flavor obtained by the ethanol extraction of the flavoring ingredients of vacuum dehydrated cherries. The two products were then blended with sucrose. The resulting finished product was used as a means for obtaining flavored, carbonated jam, berry, or fruit preserves.

Example 17

Commercial potato starch was subjected to dehydration to a moisture content of 0.2% and then sorbed with an atomized vegetable flavor. This resulted in a dry powder consisting of potato starch and vegetable flavoring ingredients.

In place of potato starch, one could use substantially anhydrous boiled potato solids.

Example 18

An anhydrous fruit flavor vapor obtained from low temperature, vacuum dehydrated fruits was sorbed into anhydrous carbonated phosphated starch. This resulted in a starch flavorant capable of exerting new flavoring effects when added to food products such as bakery products, confectionery, pastry or chocolates.

Example 19

Anhydrous carbonated corn syrup solids were blended with comminuted chocolate. This produced a chocolate having a new taste effect caused by the presence of the $CO_2$.

Other confections such as chocolate coated candies, chewing gum, or marshmellows also resulted in new, changed, and attractive flavoring effects when the said carbonated corn syrup solids, either alone or in conjunction with simultaneously sorbed fruit flavor vapors, was used.

Example 20

Anhydrous carbonated phosphated starch produced, for example, as described in Example 7, was sorbed with some anhydrous $CO_2$ and a dry flavor vapor mixture consisting of an anhydrous ethanol solution of anhydrous lactic acid. This flavor vapor mixture was obtained by first dissolving highly concentrated liquid lactic acid with anhydrous ethanol, treating the resulting alcoholic lactic acid solution to a solid desiccant to remove all moisture, and then spraying the resulting anhydrous lactic acid alcohol solution.

This produced a powdered lactic acid carbohydrate vehicle that can be served as a simple means for applying lactic acid to a variety of food products, without resorting to the expense and difficulties involved in using the aqueous, highly corrosive lactic acid of commerce.

Having thus fully described and illustrated the character of the invention, what is desired to be secured and claimed by Letters Patent is:

1. A method of transforming volatile food flavors into a substantially stable, fixed, particulate, alcoholic dry beverage powder composition, which comprises:
   (1) Dehydrating a vapor-sorbable, particulated, starch-based polysaccharide material until the moisture conten is less than 0.75%, (2) Cooling the said dehydrated material in an anhydrous medium to a food flavor vapor-sorbing temperature, and
(3) Exposing the said dehydrated material to anhydrous ethanol, and to one or more anhydrous food beverage flavors from the group comprising carbon dioxide, and aroma volatiles from cereals, fruits, or vegetables.

2. A dry, reconstitutable alcoholic beverage comprising substantially anhydrous corn syrup solids containing sorbed therein a mixture of anhydrous vapors of ethanol and volatile food flavors; said dry, reconstitutable alcoholic beverage product produced according to the process of claim 1.

3. A dry alcoholic beverage powder comprising anhydrous sugars, and anhydrous polysaccharides having sorbed therein a mixture of anhydrous vapors of ethanol and volatile food flavors; said dry beverage powder produced according to the process of claim 1.

4. A dry, reconstitutable beer beverage powder comprising anhydrous sugars, and substantially anhydrous malt syrup solids having sorbed therein a mixture of anhydrous vapors of ethanol and volatile beer flavorings and aromas; said dry, reconstitutable beer powder produced according to the process of claim 1.

5. A dry, reconstitutable carbonated beer beverage comprising anhydrous sugar, and carbonated anhydrous malt syrup solids having additionally sorbed therein a vapor-blend of anhydrous ethanol, hops aromatics, and volatile beer flavorings; said dry reconstitutable beer powder produced according to claim 1.

References Cited

UNITED STATES PATENTS

| | | | |
|---|---|---|---|
| 186,712 | 1/1877 | Clotworthy | 99—140 |
| 2,603,569 | 7/1952 | Evanston et al. | 99—79 X |
| 2,738,276 | 3/1956 | Blench | 99—71 |
| 3,012,893 | 12/1961 | Kremznet et al. | 99—134 |

OTHER REFERENCES

Sivetz, M., Coffee Processing Technology, The Avi Publishing Company, Inc., Westport Conn., 1963 (pages 36–38).

LIONEL M. SHAPIRO, *Primary Examiner.*

D. M. NAFF, *Assistant Examiner.*

U.S. Cl. X.R.

99—28, 71, 78, 79, 134, 140